No. 736,880. PATENTED AUG. 18, 1903.
E. D. ROCKWELL.
FISH LINE REEL.
APPLICATION FILED MAR. 7, 1903.
NO MODEL. 2 SHEETS—SHEET 1.
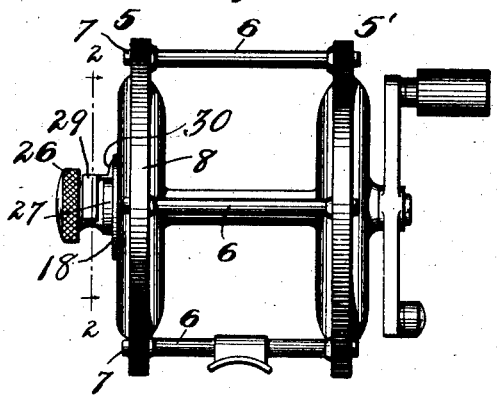
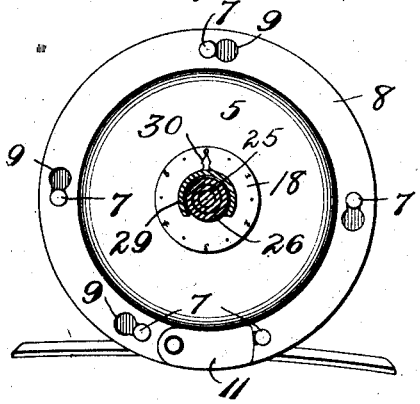
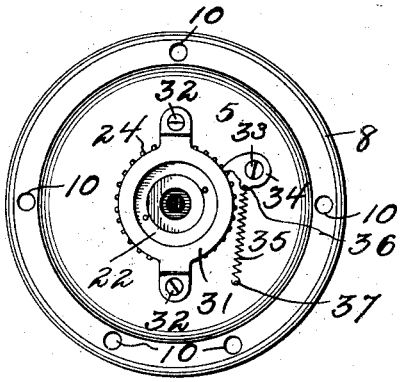
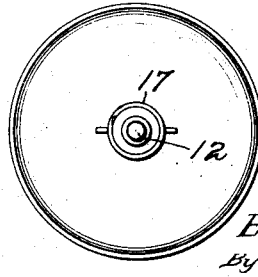
Witnesses:
F. G. Campbell.
Frances E. Blodgett.
Inventor:
Edward D. Rockwell.
By his Attorneys
Blodgett & Eck No. 736,880. PATENTED AUG. 18, 1903.
E. D. ROCKWELL.
FISH LINE REEL.
APPLICATION FILED MAR. 7, 1903.
NO MODEL. 2 SHEETS—SHEET 2.
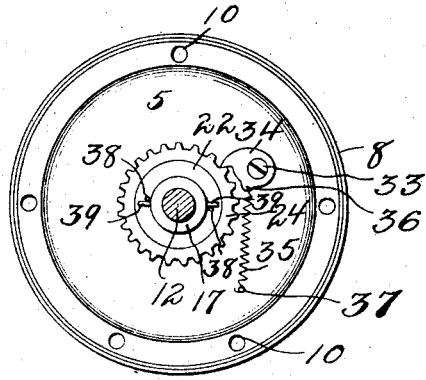
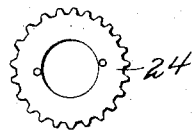
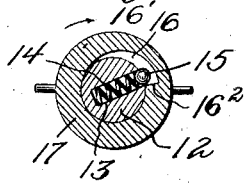
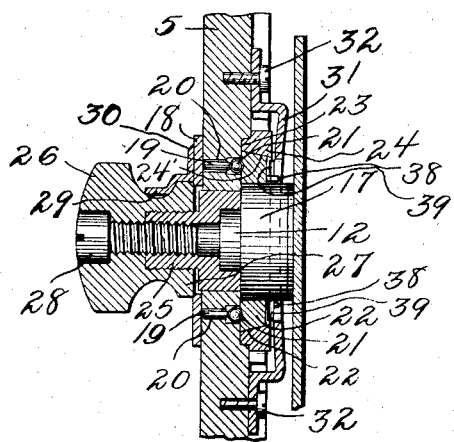
Witnesses:
F. G. Campbell.
Frances E. Blodgett.
Inventor:
Edward D. Rockwell.
By his Attorneys
Blodgett & Eck No. 736,880.                                      Patented August 18, 1903.

UNITED STATES PATENT OFFICE.

EDWARD D. ROCKWELL, OF BRISTOL, CONNECTICUT, ASSIGNOR TO THE LIBERTY BELL COMPANY, OF BRISTOL, CONNECTICUT, A CORPORATION OF CONNECTICUT.

FISH-LINE REEL.

SPECIFICATION forming part of Letters Patent No. 736,880, dated August 18, 1903.

Application filed March 7, 1903. Serial No. 146,773. (No model.)

*To all whom it may concern:*

Be it known that I, EDWARD D. ROCKWELL, a citizen of the United States, residing at Bristol, in the county of Hartford and State of Connecticut, have invented certain new and useful Improvements in Fish-Line Reels, of which the following is a specification.

My invention relates to fish-line reels.

One of the main objects of the invention is the provision of means whereby the brake and click devices may be operative when the line is being pulled out, but will not be affected when said line is wound in.

A further object of the invention is the provision of means whereby the brake and click devices may be controlled by a single knob.

A further object of the invention is the provision of an indicating device upon the exterior of the reel, whereby the same or varying degrees of tension may with certainty be applied to the "drag" mechanism when desired.

Further objects and advantages of the invention will be set forth in the detailed description which now follows.

In the accompanying drawings, Figure 1 is a side view of a reel constructed in accordance with the invention. Fig. 2 is a sectional view upon line 2 2 of Fig. 1, illustrating the manner in which the indicating-point is mounted upon the shank of the knob. Fig. 3 is a view of the inner face of one of the end plates of the reel in which the click and drag mechanism is mounted. Fig. 4 is a view of one of the flanges of the spool, showing a clutch element mounted upon the spindle thereof. Fig. 5 is a view similar to Fig. 3 with the retaining-plate removed to more clearly illustrate the parts comprising the click and drag mechanism, the spindle of the spool being indicated in section therein. Fig. 6 is an enlarged sectional view of said click and drag mechanism. Fig. 7 is a view of a modification hereinafter described, and Fig. 8 is a sectional view of the spindle of the spool and the clutch element mounted thereon.

Like numerals designate similar parts throughout the several views.

Referring to the drawings, the numerals 5 5' designate the end plates of a fish-line reel, and 6 the rods commonly employed for fastening said plates together, said rods being headed at 7. Spun or otherwise loosely secured upon end plate 5 is a locking-plate 8, having keyhole-slots 9 formed therein, whereby after the ends of said rods have been inserted in recesses 10 in end plate 5 said locking-plate may be turned to cause the walls of the narrow portions of the keyhole-slots 9 to engage the headed ends 7 of the rods and to thereby lock the elements of the structure together, after which a latch 11 is swung into the position illustrated in Fig. 2 to prevent accidental movement of the locking-plate. The spindle 12 of the spool is recessed, as at 13, and in said recess is a spring 14, bearing against a ball 15 to force said ball into a recess 16, formed in a clutch 17, mounted for rotative movement upon the spindle 12. The recess 16 has an inclined wall 16', terminating in a locking-shoulder 16², the parts described forming a ball-ratchet between the spindle 12 and clutch 17, whereby said spindle may rotate independently of the clutch when the line is being wound in, but will automatically engage said clutch when the line is drawn out, as will be hereinafter described.

Upon the exterior of end plate 5 is a dial 18, which may be marked or graduated in any desired manner, said dial carrying pins 19, entering perforations 20 of end plate 5 and bearing against balls 21, which in turn bear against a friction-ring 22, having its periphery beveled, as at 22', for a purpose hereinafter described.

Mounted for rotation in a recess 23 of plate 5 is a toothed annulus 24, having its inner circumferential wall beveled, as at 24', to conform to the beveled wall 22' of friction-ring 22, which it encircles.

Threaded upon a hollow stud 25, carried by the plate 5, is a knob 26, a flange 27 of which bears against the dial 18, as illustrated in Fig. 6. A retaining-screw 28 secures said knob against accidental displacement. Sprung upon the shank of knob 26 is a split ring 29, having a pointer 30, coacting with dial 18, as will be hereinafter described.

The toothed annulus 24 is secured against accidental displacement by means of a bowed retaining-plate 31, secured to end plate 5 by screws 32 and bearing against said annulus, as best shown in Figs. 3 and 6.

Pivoted at 33 to plate 5 is a click 34, which is kept in engagement with the teeth of the annulus 24 by means of a spring 35, secured to said click at 36 and to plate 5 at 37.

Clutch-pins 38 and 39, carried by clutch 17 and friction-ring 22, serve a purpose which will be set forth in the description of the operation of the device which now follows.

When a fish takes the hook and starts to run with the line, the spindle 12 of the spool rotates in the direction indicated by the arrow in Fig. 8 and through the action of the ball-ratchet therein illustrated causes the clutch 17 to rotate in the same direction. Referring to Figs. 5 and 6, it will be seen that the pins 38, carried by friction-ring 22, project into the path of pins 39, carried by clutch 17, whereby said friction-ring is also caused to rotate with the clutch. When it is desired to apply the click-and-drag mechanism, the knob 26 is turned to force the dial 18 toward plate 5. This action causes the pins 19 to bear against the balls 21 with sufficient force to bind the friction-ring 22 to the toothed annulus 24 through their beveled locking-faces, hereinbefore described. When this is done, it will be seen that the toothed annulus is forced to rotate with the friction-ring, and any desired resistance may be applied to said annulus by turning the knob 26 to bind said annulus against the face of retaining-plate 31. When the spool is rotated to wind in the line, the ball-ratchet (illustrated in Fig. 8) will permit the spindle 12 to rotate without actuating the clutch 17 or the brake and click devices. After the line has been "set" the pointer 30 of split ring 29 is moved independently of the knob 26 to zero, as indicated in Fig. 2, and when a fish has been landed and knob 26 has been moved to apply whatever drag may have been necessary in playing the fish it is only necessary to turn knob 26 until the pointer again indicates zero to insure having the same drag upon the line when it is again set.

In Fig. 7 the clutch-pins 38 are carried by the toothed annulus. By virtue of this construction it is not necessary to apply a drag to the annulus before the click will sound, for said annulus will be caused to rotate whenever the line is pulled out.

From the foregoing description it will be seen that means have been provided for accomplishing the objects of the invention as hereinbefore set forth in a simple and efficient manner, and while the elements herein shown and described are well suited to accomplish the end sought it is to be understood that other forms of clutches may be substituted for those shown and described, and changes may be made in the details of the indicating devices, if desired, without departure from the invention.

Having described my invention, what I claim is—

1. In a fish-line reel, the combination, with a drag, of a knob controlling said drag, and an indicating-point mounted upon said knob and capable of movement with relation thereto.

2. In a fish-line reel, the combination, with a drag, of a knob controlling said drag; an indicating-point mounted upon said knob and movable with relation thereto, and a dial with which said point coacts.

3. In a fish-line reel, the combination, with the reel-spindle, of a clutch carried upon said spindle; brake and click devices; a knob controlling both of said devices; and means for causing the clutch to automatically engage and actuate said devices when the line is pulled out.

4. In a fish-line reel, the combination, with the reel-spindle, of a clutch mounted upon said spindle, brake and click devices, a knob controlling said devices, an indicating device carried by said knob; and means whereby said clutch will actuate the brake and click devices when the line is pulled out, but will not affect said devices when the line is wound in.

5. In a fish-line reel, the combination, with the reel-spindle, of brake and click devices, a knob controlling both of said devices, a clutch loose upon said spindle, and adapted to engage said brake and click devices, and means for locking said clutch to the reel-spindle when the line is drawn out, and for permitting said spindle to rotate free of said clutch when said line is wound in.

6. In a fish-line reel, the combination, with the reel-spindle, of a clutch loosely mounted upon said spindle; brake and click devices controlled by said clutch; means for locking said clutch to the spindle when the line is drawn out; manually-operated means also controlling said brake and click devices; and an indicating-point carried by said means.

7. In a fish-line reel, the combination, with the reel-spindle, of a clutch actuated when the line is drawn out; brake and click devices; a locking-ring having a locking-face adapted to engage said brake and click devices; a device controlling the movement of said locking-ring; and means for causing the clutch to engage said locking-ring.

8. In a fish-line reel, the combination, with the reel-spindle of a clutch actuated when the line is drawn out; brake and click devices; a locking-ring having a locking-face adapted to engage said brake and click devices; a knob upon the exterior of the reel controlling the movement of the locking-ring; and means for causing the clutch to engage said locking-ring.

9. In a fish-line reel, the combination, with the reel-spindle, of a clutch actuated when the line is drawn out; brake and click devices; a locking-ring having a locking-face adapted to engage said brake and click devices; a device controlling the movement of said locking-ring; means for causing the clutch to actuate the locking-ring; and an indicating device carried by the means controlling the movement of the locking-ring.

10. In a fish-line reel, the combination, with the reel-spindle; of a clutch actuated when the line is drawn out; brake and click devices; a locking-ring having a locking-face adapted to engage said brake and click devices; a device controlling the movement of said locking-ring; means for causing the clutch to actuate said locking-ring; a dial; and an indicating-point carried by the device controlling the movement of the locking-ring and coöperating with said dial.

11. In a fish-line reel, the combination, with the reel-spindle; of a clutch actuated when the line is drawn out, a toothed annulus; a click in engagement with said toothed annulus; a locking-ring, means for causing the clutch to engage said locking-ring, and means for locking said ring to the toothed annulus.

12. In a fish-line reel, the combination, with the reel-spindle; of a clutch actuated by said spindle when the line is drawn out, a toothed annulus, a click in engagement with said annulus; a locking-ring; means for locking said ring to the toothed annulus, and means for causing the clutch to engage said locking-ring.

13. In a fish-line reel, the combination, with the reel-spindle, of a clutch actuated by said spindle when the line is drawn out; a toothed annulus; a click in engagement with said annulus; a locking-ring; means for locking said ring to said annulus; means for causing the clutch to engage said locking-ring; a bowed plate; and means for binding said annulus frictionally against said plate.

14. In a fish-line reel, the combination, with the reel-spindle; of a clutch actuated by said spindle when the line is drawn out; a toothed annulus; a click in engagement with said annulus; a locking-ring; means for locking said ring to said annulus; means for causing the clutch to engage said locking-ring; a bowed plate; means for binding said annulus frictionally against said plate; and a device for indicating the degree of movement of said means.

15. In a fish-line reel, the combination, with the reel-spindle; of a clutch actuated by said spindle when the line is drawn out, and remaining stationary when said line is wound in; a toothed annulus; a click in engagement with said annulus; a locking-ring; a knob for forcing said ring into locking engagement with said annulus; means for causing said clutch to engage said locking-ring; a bowed plate; means for binding said annulus frictionally against said plate; a dial upon the exterior of the reel; and an indicating-point carried by the knob to indicate the degree of movement thereof, upon said dial.

In testimony whereof I affix my signature in presence of two witnesses.

EDWARD D. ROCKWELL.

Witnesses:
EDSON M. PECK,
HOWARD S. PECK.